Figure 1:
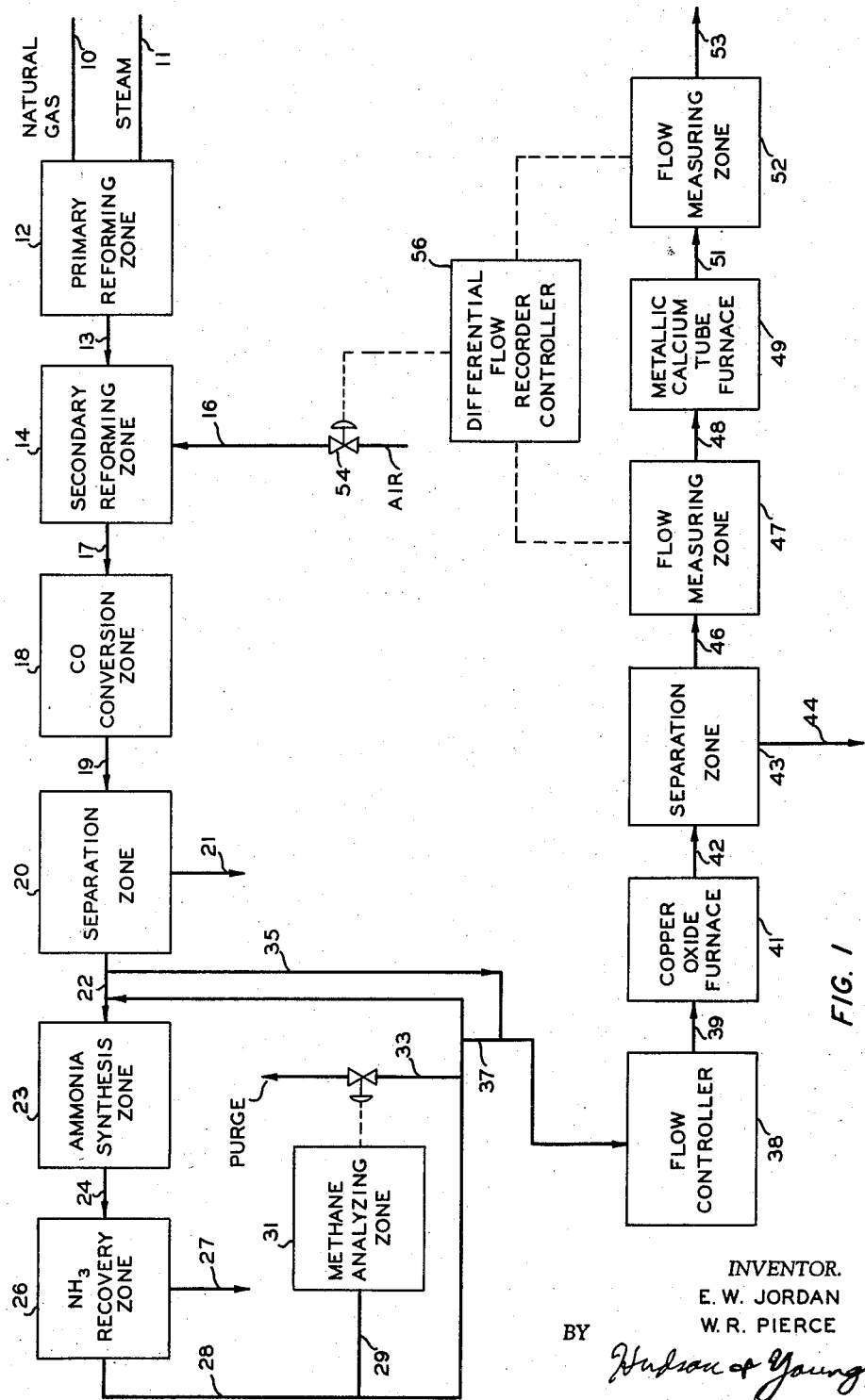

FIG. I

INVENTOR.
E. W. JORDAN
W. R. PIERCE
BY
*Hudson & Young*
ATTORNEYS

INVENTOR.
E. W. JORDAN
W. R. PIERCE
BY Hudson & Young
ATTORNEYS

United States Patent Office 2,894,821
Patented July 14, 1959

2,894,821

CONTROL OF NITROGEN IN AMMONIA SYNTHESIS

Earl W. Jordan, Dumas, Tex., and Weller R. Pierce, Bartlesville, Okla., assignors to Phillips Petroleum Company, a corporation of Delaware Application January 2, 1951, Serial No. 203,868

11 Claims. (Cl. 23—198)

This invention relates to a continuous process for the control of nitrogen content in ammonia synthesis gas. In one of its more specific aspects it relates to a method whereby the nitrogen content of feed gas to an ammonia synthesis process is continuously controlled by regulation of the volume of air introduced to the secondary reformer. One specific embodiment of this invention relates to control of nitrogen in the feed gas to ammonia synthesis in relation to the ratio of hydrogen and nitrogen in the cycle gas.

This application is a continuation-in-part of our co-pending application Serial No. 136,718, filed January 4, 1950, and now abandoned.

In the process for manufacturing ammonia the first step is usually that of producing a feed gas containing 3 parts of hydrogen for each part of nitrogen. This may be accomplished by reacting a hydrocarbon such as methane as may be found in natural gas with superheated steam in the presence of a suitable catalyst. This reaction generally takes place in what is known as the primary reformer. The effluent from this reaction comprising hydrogen, carbon monoxide, carbon dioxide, and methane, is passed to what is known as the secondary reformer to which is also added a sufficient quantity of air which, after the oxygen is removed in the form of oxygen containing compounds, provides the correct proportion of nitrogen. In the secondary reformer a portion of the hydrogen and carbon monoxide are oxidized with the oxygen in the air and this combined with the reformed methane provides a product containing steam, carbon dioxide, carbon monoxide, nitrogen, hydrogen, and methane. This material is then passed to a shift converter for conversion of most of the carbon monoxide to carbon dioxide. Suitable means are then used for removing the steam such as a water quench, the carbon dioxide such as amine scrubbing and the residual carbon monoxide such as copper ammonium formate solution. Such treatment leaves a product gas containing primarily hydrogen and nitrogen although some methane and inert gases such as argon, helium, and so forth will also be present. This gas which is the feed for ammonia production is passed to an ammonia converter at an elevated pressure where it is converted in the presence of a suitable catalyst to ammonia. The effluent gas from such conversion or synthesis as it is often called, is passed through suitable equipment for removal of ammonia such as conventional cooling and refrigerating equipment. After the removal of the ammonia, the remaining gas will still contain some hydrogen and nitrogen along with minor quantities of methane and the previously mentioned inert gases which are now in greater proportions than in the feed gas because of the removal of some of the hydrogen and nitrogen as ammonia. For economical reasons this gas must be recycled to utilize as much hydrogen and nitrogen as possible. It is evident that since the make-up feed gas to the ammonia synthesis step contains a quantity of methane all the time, some means must be utilized for maintaining the methane content of the cycle gas and concomitantly of the synthesis feed gas from building up beyond a desired amount. One reason for requiring this is that the ammonia conversion is considerably reduced when too great a quantity of methane is present, apparently due mainly to dilution of the hydrogen and nitrogen. The usual procedure is to maintain the methane content of the feed gas to ammonia synthesis, including cycle gas, at a desired percentage by purging a portion of the cycle gas.

It is evident that slight fluctuations in the ratio of natural gas to steam may take place in the primary reformer thus causing some variation in the quantity of hydrogen produced. Other causes of variation in the hydrogen content will be the activity of the reforming catalyst used, the quantity of air supplied to the secondary reformer, space velocity, and reforming temperatures. For economical reasons it would be very desirable to maintain the ratio of nitrogen to hydrogen at about 1 to 3 even though there may be fluctuations in the quantities of hydrogen produced.

An object of this invention is to provide a feed gas to ammonia synthesis containing hydrogen and nitrogen in a ratio of 3 to 1.

Another object of this invention is to provide a method for controlling the nitrogen content of feed gas to ammonia synthesis.

Another object of this invention is to continuously control the ratio of hydrogen to nitrogen in feed gas to ammonia synthesis by controlling the amount of air introduced to the secondary reformer in relation to the variation in ratio of hydrogen to nitrogen in the feed gas.

Another object of this invention is to control the ratio of hydrogen to nitrogen content of feed gas to ammonia synthesis by controlling the amount of air introduced to the secondary reformer in relation to the variation in ratio of hydrogen to nitrogen as determined in the cycle gas.

Still another object is to provide a continuous method for automatically determining the nitrogen content of cycle gas to ammonia synthesis and to control the air feed to the secondary reformer in relation to this quantity.

Other objects and advantages of our invention will be apparent to one skilled in the art from the following discussion and disclosure.

We have discovered a very advantageous method for continuously controlling the overall ratio of nitrogen to hydrogen in the feed gas to ammonia synthesis by the determination of the hydrogen and/or nitrogen content or the hydrogen-nitrogen ratio of the cycle or feed gas, and by such determination controlling the air feed to the secondary reformer which is the source of nitrogen.

In the practice of a preferred embodiment of our invention, a portion of cycle gas, i.e., gas recycled from and back to ammonia synthesis of which the methane content is maintained constant as by purging a portion of the stream when the methane content becomes too high, is continuously passed through a flow controller whereby a constant volume of flow is maintained. This gas, which contains byth hydrogen and nitrogen in addition to methane and inert gases, is passed to a copper oxide furnace which converts the hydrogen and methane to water and carbon dioxide, concomitantly reducing the copper oxide. The effluent from this reaction is then suitably treated to remove the water and carbon dioxide thus leaving a gas containing nitrogen and inert gases such as argon, helium, and the like. Other methods of oxidizing combustibles in the gas can be utilized, for example, a controlled amount of air can be used to burn combustibles in the gas and the combustion products removed as above. In such a case, allowance for nitrogen added in the oxidizing air must be made.

After removal of the water and carbon dioxide the gas is passed through a suitable flow meter and then to treatment in contact with metallic calcium for removal of nitrogen as calcium nitride. Suitable temperatures for this reaction are generally within the range of 700-750° C. In this manner nitrogen is removed from the gas stream leaving only the inert gases. These gases are then passed through a second flow meter and on to vent. Since a known volume of gas is withdrawn and this gas contains a known or fixed percentage of methane, this first meter while measuring the nitrogen and inerts also gives a measurement of the hydrogen content of the said withdrawn gas. The second flow meter measures the differential across the calcium tube furnace which is a direct measure of the nitrogen content of the gas.

A multipoint differential flow recorder-controller can be utilized to take advantage of the determination of the nitrogen and hydrogen content of the sample gas and to control the air inlet to the secondary reformer in response to adverse changes in the ratios of these, one to the other.

The recorder-controller is so adjusted, knowing the constant rate of flow of the sample stream at its origin and the constant methane content thereof, to record the flow of hydrogen which amounts to the initial flow of sample gas less the flow after the removal of hydrogen and methane after adding the known constant quantity of methane present. Such adjustments may be made in known manner on conventional multipoint recorder-controllers.

The recorder-controller is also adjusted to record the differential in flow across the calcium tube furnace as measured by the first and second flow meters. The recorder-controller is then set so as to actuate the valve in the air line to the secondary reformer in response to changes in the ratio of hydrogen to nitrogen as measured by flow.

The following will exemplify the above discussed method for determining the hydrogen and nitrogen content of an ammonia synthesis feed gas. A controlled volume of gas comprising, say, 40 cubic centimeters per minute, is used. By previous analysis the methane content is 8 volume percent of the total gas or 3.2 cubic centimeters. The gas which is withdrawn continuously from the ammonia synthesis feed is passed through a copper oxide furnace under conditions which will cause all of the methane and hydrogen present to be converted to water and carbon dioxide. After removal of these materials the gas is then passed through a flow meter of a conventional type which will read the reduction in gas flow from the constant volume originally started with and which shows that the flow of gas has been reduced by 27.2 cubic centimeter per minute. An alternative is to adjust this flow meter so that it automatically deducts the known quantity of methane from the volume of gas by which the flow was reduced thus causing the meter to read the hydrogen content directly. Conventional meters adapted from such adjustment as are known to those skilled in the art are used. When this alternative is not employed the reading of the flow meter is transmitted to a conventional differential recorder-controller which makes a similar adjustment and records directly the volume of hydrogen. Following measurment of the gas for determination of the hydrogen present, it is contacted with metallic calcium at conditions which cause the nitrogen to react with the calcium to form calcium nitride thus removing the nitrogen from the gas. Measurement of the gas flow per minute is again made, and the differential between this volume and that measured by the first flow meter, taking into consideration the correction for methane if the first flow meter was adjusted to read hydrogen directly, is the volume of nitrogen present which is 8 cubic centimeters. The remaining gas, that which is directly measured by the second flow meter, comprises inerts such as argon and helium. In the present case this would amount to 4.8 cubic centimeters. By comparison of the ratio of hydrogen to nitrogen, the amounts of which are determined as just discussed, with a desired ratio, the recorder-controller is made to actuate the valve in the air line to the secondary reformer when the ratios do not compare favorably. A diaphragm or solenoid valve of conventional design is used and is actuated either by changes in pressure of instrument air on the diaphragm of the valve or variation in electrical impulse to the solenoid. By the process above discussed, we not only maintain a more accurate and constant control of the nitrogen content of the ammonia synthesis feed gas, but eliminate the irregularities which would obviously be present when attempting to make this control manually.

In another embodiment of our invention which is practiced in combination with the invention disclosed in copending application Serial No. 136,742, filed January 4, 1950, now Patent No. 2,667,410, which teaches analyzing the methane content of the effluent from a primary reformer in an ammonia synthesis process and by such analysis controlling both the feed gas to the reformer and the gas to the heater for said reformer, a portion of the feed gas or make-up gas to the ammonia synthesis is withdrawn prior to introduction thereto of cycle gas. By operating in this manner the methane content of the make-up gas is known (changes in nitrogen and hydrogen content will cause very slight change in the per cent methane: so small that they may be disregarded) and more rapid changes in the ratio of feed gas components may be made without first waiting for the gas to pass through the ammonia synthesis reactor.

In another embodiment of our invention, the hydrogen-nitrogen ratio in an ammonia synthesis process is controlled by measuring the thermal conductivity of a portion of the cycle gas in a thermal conductivity cell. Since the methane content of the cycle gas is kept constant as hereinbefore described, the variables in composition of the cycle gas are hydrogen and nitrogen-argon. Since nitrogen and argon are both added by air, they may be treated as one gas; thus the cycle gas may be considered as containing only two variables, i.e., hydrogen and nitrogen-argon. The thermal conductivity of this two component system can be measured and the hydrogen-nitrogen ratio controlled by controlling the addition of air to the secondary reformer in response to changes in the thermal conductivity from a predetermined value. A recorder-controller of conventional type can be used to respond to the thermal conductivity changes as measured by the thermal conductivity cell and actuate a valve in the air line to the secondary reformer thereby maintaining the desired hydrogen-nitrogen ratio by varying the amount of air supplied to the secondary reformer.

In another embodiment of our invention the hydrogen-nitrogen ratio can be controlled in an ammonia synthesis process of the type described above by employing a gravitometer of conventional design for measuring the density of the cycle gas. As pointed out above, the cycle gas may be considered a two component system, i.e., hydrogen and nitrogen-argon, provided the methane content is maintained constant. The density of this two component system can be measured by said gravitometer and the addition of air to the secondary reformer controlled in response to said measurement. A recorder-controller can be used to respond to the changes in gravity of the cycle gas as measured by said gravitometer and operate a valve in the air line to the secondary reformer responsive to changes in the said measured gravity from a predetermined value so as to maintain the desired hydrogen-nitrogen ratio.

In still another embodiment of our invention for the control of the hydrogen-nitrogen ratio in an ammonia synthesis process, a differential flow recorder-controller, with methane and hydrogen removed between the two orifices, can be used to control the addition of air to the secondary reformer and hence control the hydrogen-nitrogen ratio in an ammonia synthesis process. As was noted above, the methane content of the cycle gas is maintained constant and known, thus the volume of hydrogen removed can be readily calculated by subtracting the known volume of methane from the total decrease in the cycle gas which occurs in the combustion tube between the two orifices. The methane and hydrogen are removed between the orifices by passing the cycle gas over copper oxide and employing suitable scrubbing as hereinbefore described. This measurment of the volume of hydrogen contained in the cycle gas can be used by the differential flow recorder-controller to operate a valve in the air line to the secondary reformer and thereby control the addition of air to the secondary reformer and hence the hydrogen-nitrogen ratio in an ammonia synthesis process.

It will be apparent that the last three embodiments of our invention, while having the advantage of being simple and easy to operate, are not as accurate as the preferred embodiment. The embodiment to be used in any particular case will depend upon the accuracy of control necessary, and the impurities in the charging gas.

A more complete understanding of some of the many aspects of our invention may be had by referring to Figure 1 of the attached drawing, which is a schematic flow diagram of said preferred modification of my invention, in conjunction with the following discussion. Various additional valves, pumps, and other conventional equipment necessary for the practice of this invention will be familiar to one skilled in the art and have been omitted from the drawing for the sake of clarity. The description provides one method of operating our process; however, while this is representative in general of our process, various minor changes may be made in adapting it to the various conditions within the scope of the invention.

Figure 2:
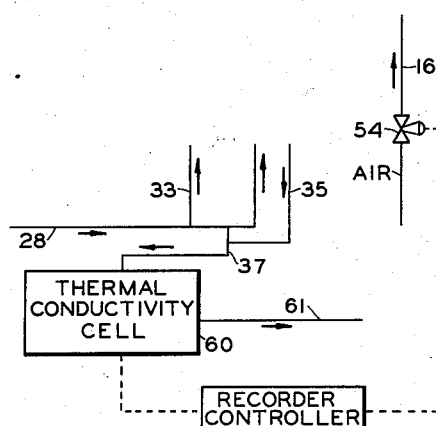

Figure 2 is a schematic flow diagram of a modification of our invention wherein the hydrogen-nitrogen ratio is controlled in an ammonia synthesis process by measuring the thermal conductivity of the cycle gas. The various reforming, conversion, separating, synthesis, recovery and methane analyzing zones are the same as in Figure 1 and therefore are not shown as the function of the modification will be apparent to one skilled in the art upon reading of the discussion and examining the drawings herein shown.

Figure 3:
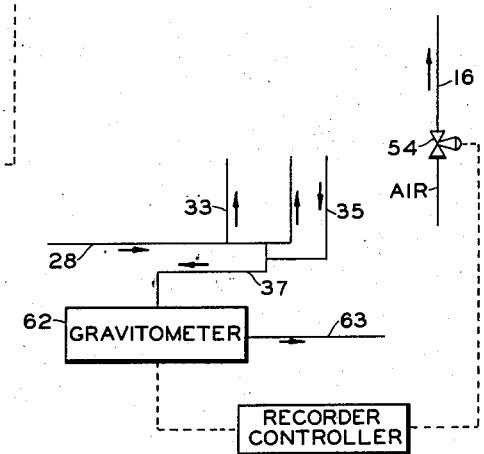

Figure 3 is a schematic flow diagram of another modification of our invention wherein the hydrogen-nitrogen ratio in an ammonia synthesis process is controlled by measuring the density of the cycle gas. Again all the steps in the process are not shown as they are the same as in Figure 1 and repeating said steps is not necessary as one skilled in the art will understand the function of the modification without such repetition.

Figure 4:
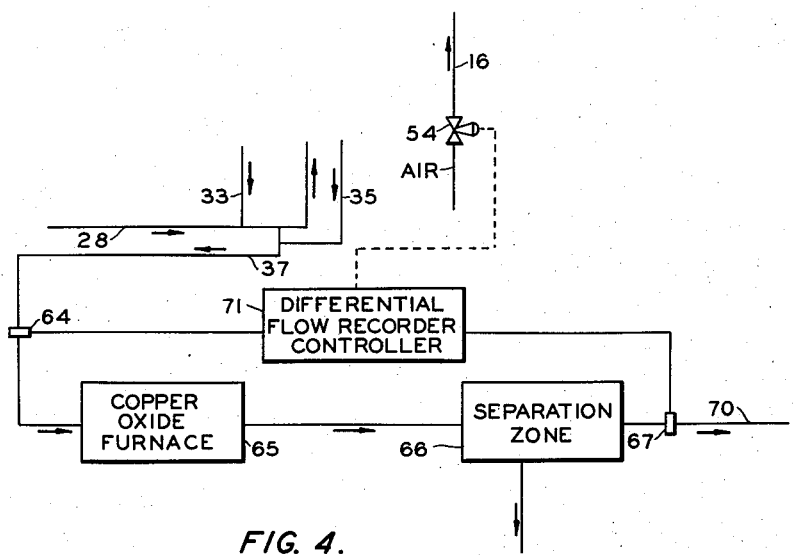

Figure 4 is a schematic flow diagram of still another modification of our invention wherein the hydrogen-nitrogen ratio in an ammonia synthesis process is controlled by a differential flow recorder-controller. Hydrogen and methane are removed between the orifices of the controller and the decrease in volume of cycle gas, taking into account the known volume of methane removed, is used to control the air added to the reforming step and hence control the hydrogen-nitrogen ratio. Again all the steps in the process are not shown as they are the same as in Figure 1 and therefore are not necessary in an illustration of a modification of a method of controlling the hydrogen-nitrogen ratio in the process.

Refer now to Figure 1 in the drawing, the discussion of which will also exemplify said preferred modification of our invention. Natural gas and superheated steam are passed through lines 10 and 11, respectively, to primary reforming zone 12 where they contact a suitable reforming catalyst such as supported reduced nickel oxide at a temperature preferably in the range of 700–750° C. The effluent from the zone containing primarily hydrogen, carbon monoxide, and carbon dioxide along with a minor quantity of methane is passed through line 13 to secondary reforming zone 14. In this zone the gas contacts another bed of reforming catalyst which may either be the same as that used in the primary reforming zone or different. A suitable temperature for this reaction is in the range of 850–1100° C. Introduced also to this zone is a stream of air passed through line 16 which provides the nitrogen to be used in the ammonia synthesis. In the secondary reforming zone the oxygen from the air oxidizes some of the hydrogen and carbon monoxide so that the oxygen may be easily removed leaving the nitrogen while a portion of the methane is reformed. The effluent from zone 14 is now passed via line 17 to a carbon monoxide conversion zone 18. In this zone the gas is contacted with a catalyst such as iron oxide and as is used in conventional carbon monoxide to carbon dioxide conversion. By such treatment the carbon monoxide content of the reformed gases now containing nitrogen is reduced to about 2.5 to 5 volume percent. From conversion zone 18 the gases are passed to a separation zone 20 through line 19 where water and carbon dioxide are removed by conventional means such as quenching and amine scrubbing as through line 21. The gas to be fed to ammonia synthesis now contains primarily hydrogen and nitrogen with only minor quantities of inert gases and methane. This gas is passed through line 22 to ammonia conversion zone 23 where it contacts an iron oxide catalyst at a temperature in the range of 450–550° C. and a pressure in the range of 1500 to 15,000 pounds per square inch. Conversion in this zone is desirably maintained at at least 10 percent per pass and preferably in the range of 10–20 percent per pass. Products from synthesis zone 23 are passed through line 24 to ammonia recovery zone 26 where suitable means are employed for condensing the ammonia and causing its removal in this manner. The liquid ammonia from this zone is removed via line 27. The effluent gas is removed from ammonia recovery zone 26 through line 28 and recycled to synthesis zone 23 via line 22. A side stream of the recycled gas is passed through line 29 to methane analyzing zone 31 which may be of the type disclosed in copending application, Serial No. 136,776, filed January 4, 1950, now abandoned, or an infrared spectrophotometer. The methane content is continuously determined, which determination is used to control a purge of the cycle gas. The analyzing zone is so set up as to control the valve in purge line 33 in such a manner that a portion of the cycle stream is vented to maintain the methane content within a predetermined range.

Another portion of the make-up gas for the ammonia synthesis is withdrawn from line 28 through line 37 and is passed through a suitable flow controller 38 and through line 39 to a copper oxide furnace 41. In another modification wherein a methane analyzer is used to control the methane content of the gas from the reformers, a sample stream for hydrogen and nitrogen analyses may be withdrawn from line 22 upstream of the recycle inlet as through line 35. In the copper oxide furnace the hydrogen and methane content of the cycle gas is burned to water and carbon dioxide, oxygen being supplied by the copper oxide. Suitable temperatures for this reaction are in the range of 600–900° C. and preferably in the range of 600–700° C., the latter made possible by the presence of about 1 percent iron oxide in the copper oxide. The effluent gas from the copper oxide furnace is then passed to separation zone 43 through line 42. In this zone the water and carbon dioxide are removed as by absorption. Line 44 leading from zone 43 typifies outlets for the absorbed materials. The water produced in the copper oxide furnace may be removed by absorption in silica gel or calcium chloride or by condensation while the carbon dioxide may be removed by means of aqueous caustic or amine. The gas now containing only nitrogen and inerts such as argon and helium is passed from zone 43 through line 46 to a flow measuring zone 47 and from there through line 48 to a calcium tube furnace 49. In this furnace the nitrogen in the gas is reacted with metallic calcium at a temperature in the range of 700–750° C. and at a sufficient flow rate and contact time that calcium nitride is formed. In this manner nitrogen in the gas is consumed and removed therefrom leaving inert gases. These gases are passed from furnace 49 through line 51 to a second flow measuring zone 52 and from there to vent as by line 53. By determination of the hydrogen content of the gas by the differential in flow across the flow controller 38 and the flow measuring zone 47 less the known volume of methane, and by determination of the nitrogen content of the gas by the differential in flow across metallic calcium furnace the ratio of hydrogen to nitrogen in the cycle gas may be constantly known. These data are then used for making changes in the rate of introduction of air to the secondary reformer, thus varying the ratio of hydrogen to nitrogen in the feed gas to ammonia synthesis. In a preferred embodiment of our invention a differential flow recorder-controller 56 is connected with flow measuring zones 47 and 52 and automatically records the differential in flow across the flow controller 38 and the flow measuring zone 47 and across the calcium tube furnace. These differentials and the hydrogen to nitrogen ratio determined therefrom are then used to control the valve 54 in line 16 so as to maintain a very uniform ratio nitrogen to hydrogen in the ammonia conversion feed gas.

Referring now to Figure 2. A portion of the cycle gas is withdrawn through line 37 and passed through thermal conductivity cell 60 and vented through vent 61. The thermal conductivity of the cycle gas is measured in cell 60. The operation of such a cell is known to those skilled in the art. For example, a suitable cell includes a zone, containing an electrical heating element, through which the gas mixture is passed whose thermal conductivity is to be measured. A Wheatstone bridge is connected across the heating element in this zone and a heating element in a similar zone which contains a standard or reference gas such as air. As the thermal conductivity of the measured gas mixture increases, an increased amount of heat is conducted away from the heating element in the measuring zone and the temperature of that heating element decreases. As the temperature of the heating element decreases, the resistance of the measuring heating element decreases as compared to the standard or reference heating element. This decrease in resistance, which indicates an increase in thermal conductivity of the measured gas, is detected by the Wheatstone bridge connecting the two heating elements. If the thermal conductivity of the gas mixture decreases, less heat will be conducted away from the measuring heating element and the temperature of the heating element increases. An increased temperature of the measuring heating element increases the resistance of the measuring heating element with respect to the standard or reference heating element which indicates a decrease in thermal conductivity of the measured gas. The increased resistance of the measuring heating element with respect to the standard or reference heating element is detected by the Wheatstone bridge connecting the two heating elements. The changes in thermal conductivity of a gas mixture as detected by a Wheatstone bridge in the manner just described can be utilized to control the addition of nitrogen to an ammonia synthesis process so as to maintain the hydrogen-nitrogen ratio at the desired value.

As was noted above, the methane content of the cycle gas is constant and since both nitrogen and argon are added by air, the cycle gas may be considered as a two component system comprising hydrogen and nitrogen-argon. Changes in the thermal conductivity of the cycle gas, as measured by cell 60, actuates recorder-controller 68. Recorder-controller 68 operates valve 54 in air line 16 in response to changes in thermal conductivity of the cycle gas, as measured by cell 60, and thereby regulates the addition of air to the secondary reformer 14 so as to maintain the desired hydrogen-nitrogen ratio in the process. The thermal conductivity of hydrogen is approximately nine times that of the nitrogen-argon component. Therefore if the thermal conductivity of the cycle gas increases, too much hydrogen is present in the cycle gas and the controller 68 operates valve 54 so as to allow more air to enter reformer 14 and return the hydrogen-nitrogen ratio to the desired value. Likewise, if the thermal conductivity of the cycle gas decreases, there is an excess of the nitrogen-argon component in the cycle gas, and controller 68 operates valve 54 so as to reduce the supply of air to reformer 14 and thereby return the hydrogen-nitrogen ratio to the desired value.

Referring now to Figure 3. A portion of the cycle gas in an ammonia synthesis process is passed through line 37 into gravitometer 62 and vented through vent 63. Gravitometer 62 measures the gravity of the cycle gas. As was noted before, since the methane content of the cycle gas is kept constant and since nitrogen and argon are both added by air, the cycle gas may be considered a two component system comprising hydrogen and nitrogen-argon. Recorder-controller 69 operates valve 54 in air line 16 in response to changes in gravity of the cycle gas as measured by gravitometer 62 and thereby regulates the amount of air supplied to reformer 14. The specific gravity of the nitrogen-argon component of the cycle gas is approximately 14 times that of hydrogen. Therefore if the specific gravity of the cycle gas increases, there is an excess of the nitrogen-argon component and recorder-controller 69 operates valve 54 in air line 16 so as to reduce the amount of air supplied to reformer 14 thereby returning the hydrogen-nitrogen ratio to the desired value. Likewise, if the specific gravity of the cycle gas decreases, there is too much hydrogen in the cycle gas and controller 69 will operate valve 54 in air line 16 so as to increase the amount of air supplied to reformer 14 thereby returning the hydrogen-nitrogen ratio to the desired value.

Referring now to Figure 4. A portion of the cycle gas in an ammonia synthesis process is withdrawn in tube 37 and passed through orifice 64 into copper oxide furnace 65 and separation zone 66, then through orifice 67 and vented through vent 70. Methane and hydrogen are removed between orifices 64 and 67 in furnace 65 and separation zone 66 by methods hereinbefore described. The decrease in volume of the cycle gas between orifices 64 and 67 is measured by differential flow recorder-controller 71. Since the methane content of the cycle gas is held constant, the volume of the hydrogen present in the cycle gas can be readily determined by subtracting the known volume of methane in the cycle gas from the decrease in volume of the cycle gas between orifices 64 and 67. This volume of hydrogen in the cycle gas can be used to regulate the amount of air supplied to reformer 14 and thereby control the hydrogen-nitrogen ratio in the ammonia synthesis process. If the volume of the hydrogen in the cycle gas increases, as measured by differential flow recorder-controller 71, controller 71 operates valve 54 in air line 16 so as to increase the amount of air supplied to reformer 14 and return the hydrogen-nitrogen ratio to the desired value. Likewise if the volume of the hydrogen in the cycle gas decreases, controller 71 operates valve 54 in air line 16 so as to decrease the amount of air supplied to reformer 14 and thereby return the hydrogen-nitrogen ratio to the desired value.

It is within the scope of our invention to withdraw the portion of the cycle gas used to control the hydrogen-nitrogen ratio in each modification of our invention either continuously or intermittently. Also the control devices of the various modifications of our invention, if operated intermittently, can be used to control hydrogen-nitrogen ratios in several processes which are going on simultaneously.

Our invention is equally applicable to other processes for manufacturing ammonia such as from blue gas (comprising carbon monoxide and hydrogen) and blow gas (comprising carbon monoxide, carbon dioxide, and nitrogen) produced by the steam and air treatment of coke. In such a process our controller would regulate the portion of blow gas, containing the nitrogen for the ammonia, introduced to the blue gas, containing the hydrogen, in response to the hydrogen and nitrogen content of the ammonia synthesis gas.

Likewise, ammonia may be synthesized from electrolytic hydrogen to which is added a controlled quantity of air to supply the desired amount of nitrogen. In this type of process the control would be of the inlet air in response to the hydrogen-nitrogen ratio in the ammonia synthesis gas.

Although this invention has been described in terms of its preferred modifications it is understood that various changes may be made without departing from the spirit or scope of the disclosure and the claims.

I claim:

1. In a process wherein a snythesis gas comprising nitrogen and hydrogen in a predetermined ratio is fed to an ammonia synthesis zone and wherein said synthesis gas is prepared by reforming a methane containing gas with steam, introducing nitrogen and oxygen-containing gas to the reformation product thereby oxidizing a portion of said products and supplying nitrogen, removing the resulting oxidized products, passing the thus prepared gas to said ammonia synthesis zone, removing the resulting ammonia and recycling the unconverted gas, the improvement comprising continuously withdrawing a controlled volume of gas from the recycling converted gas, continuously metering the methane content of the withdrawn stream, venting a portion of said recycling unconverted gas responsive to changes in the metered methane content from a predetermined value so as to maintain the methane content of the recycling gas constant, withdrawing a second stream of gas subsequent to the preparation of the synthesis gas having a known methane content so as to provide a controlled volume thereof, continuously removing the combustible from said stream of gas, continuously metering the flow of the resulting stream of gas in terms of decreased flow from said second controlled volume withdrawn, removing nitrogen from last said resulting stream, metering the flow of gas after nitrogen removal in terms of the difference in flow before and after nitrogen removal, metering the ratio of the two differences and adjusting said oxygen-containing gas input responsive to changes in the ratio of said differences to maintain a constant nitrogen to hydrogen ratio in said synthesis gas.

2. The improvement of claim 1 wherein the second said controlled volume of gas is withdrawn prior to introducing the gas to the ammonia synthesis zone.

3. The improvement of claim 1 wherein the second said controlled volume of gas is withdrawn from said recycle gas.

4. In a process wherein a synthesis gas comprising nitrogen and hydrogen in a predetermined ratio is fed to an ammonia synthesis zone and wherein said synthesis gas is prepared by reforming a methane-containing gas with steam, introducing nitrogen and oxygen-containing gas to the reformation product thereby oxidizing a portion of said products and supplying nitrogen, removing the resulting oxidized products, passing the thus prepared gas to said ammonia synthesis zone, removing the resulting ammonia and recycling the unconverted gas, the improvement comprising continuously withdrawing a stream of the recycle gas at a predetermined constant rate to provide a controlled volume, continuously metering the methane content of the withdrawn stream, venting a portion of said recycle unconverted gas responsive to changes in the metered methane content from a predetermined value so as to maintain said methane content in said recycle gas constant, continuously withdrawing a second stream of said recycle gas having a known methane content so as to provide a controlled volume thereof, passing the said second withdrawn stream through a thermal conductivity cell, continuously determining the thermal conductivity of said stream, and adjusting said oxygen-containing gas introduction responsive to changes in said conductivity from a predetermined value so as to maintain a constant hydrogen-nitrogen ratio in said synthesis gas.

5. In a process wherein a synthesis gas comprising nitrogen and hydrogen in a predetermined ratio is fed to an ammonia synthesis zone and wherein said synthesis gas is prepared by reforming a methane-containing gas with steam, introducing nitrogen and oxygen-containing gas to the reformation product thereby oxidizing a portion of said products and supplying nitrogen, removing the resulting oxidized product, passing the thus prepared gas to said ammonia synthesis zone, removing the resulting ammonia and recycling the unconverted gas, the improvement comprising continuously withdrawing a stream of the recycle gas at a predetermined constant rate to provide a controlled volume, continuously metering the methane content of the withdrawn stream, venting a portion of said recycle unconverted gas responsive to changes in the metered methane content from a predetermined value so as to maintain said methane content in said recycle gas constant, continuously withdrawing a second stream of said recycle gas having a known methane content so as to provide a controlled volume thereof, passing the said second withdrawn stream to a gravity cell continuously determining the gravity of said gas in said cell and adjusting said oxygen-containing gas introduced responsive to changes in said gravity from a predetermined value of each to maintain a constant hydrogen nitrogen ratio in said synthesis gas.

6. In a process wherein a synthesis gas comprising nitrogen and hydrogen in a predetermined ratio is fed to an ammonia synthesis zone and wherein said synthesis gas is prepared by reforming a methane-containing gas with steam, introducing air to the reformation product thereby oxidizing a portion of said products and supplying nitrogen, removing the resulting oxidized products, passing the thus prepared gas to said ammonia synthesis zone, removing the resulting ammonia and recycling the unconverted gas the improvement comprising, continuously withdrawing a stream of the recycle gas at a predetermined constant rate to provide a controlled volume, continuously metering the methane content of the withdrawn stream, venting a portion of said recycle unconverted gas responsive to changes in the metered content from a predetermined value so as to maintain said methane content of said recycle gas constant continuously withdrawing a second controlled volume of recycle gas removing combustible products from last said withdrawn gas, metering the resulting flow in terms of ratio of said flow to said controlled volume, and adjusting the air introduction responsive to changes in said ratio to maintain a constant nitrogen to hydrogen ratio.

7. In a process wherein a synthesis gas comprising nitrogen and hydrogen in a predetermined ratio is fed to an ammonia synthesis zone and wherein said synthesis gas is prepared by reforming a methane containing gas with steam, introducing air to the reformation product thereby oxidizing a portion of said product and supplying nitrogen, removing the resulting oxidized product, passing the thus prepared gas to said ammonia synthesis zone removing the resulting ammonia and recycling the unconverted gas, the improvement comprising continuously withdrawing the stream of the recycled gas at a predetermined constant rate to provide a controlled volume, continuously metering the methane content of the withdrawn stream, venting a portion of said recycled unconverted gas responsive to changes in the metered methane content from the predetermined value so as to maintain said methane content in said recycled gas constant, withdrawing a second stream of recycled gas at a rate to maintain said second stream constant, oxidizing last said withdrawn gas thereby converting combustibles to carbon dioxide and water, removing resultant carbon dioxide and water, metering the flow of the resulting gas stream in terms of decreased flow from said control volume withdrawn, removing nitrogen from last said stream, metering the flow of gas after nitrogen removal in terms of the difference in flow before and after nitrogen removal, metering the ratio of the two differences and adjusting said air input responsive to changes in the ratio of said differences to maintain a constant nitrogen to hydrogen ratio in said synthesis gas.

8. The improvement of claim 7 wherein the combustibles of the control withdrawn volume of gas is oxidized with copper oxide in the temperature range of 600–900° C. and nitrogen is removed by contacting the nitrogen-containing gas with metallic calcium at a temperature in the range of 700–750° C. so as to form calcium nitride.

9. A process for supplying a feed gas of predetermined hydrogen-nitrogen ratio to a reaction zone, said process comprising introducing a control volume of nitrogen-containing gas to a stream of hydrogen-containing gas removing free and combined oxygen gas from said stream, passing the resulting stream to said reaction zone, continuously withdrawing a controlled volume of gas of known methane content from said reaction zone, oxidizing combustibles in said withdrawn gas metering the flow of the resultant stream in terms of the difference in flow between the control volume and the resulting stream, removing nitrogen from the last resulting stream, metering the resulting difference in flow and adjusting the nitrogen-containing gas input responsive to changes in the ratio of the said two differences to maintain said hydrogen-nitrogen ratio substantially constant.

10. The process of claim 9 wherein the nitrogen gas is air.

11. The proces of claim 9 wherein the nitrogen-containing gas is blow gas comprising carbon monoxide, carbon dioxide, and nitrogen.

References Cited in the file of this patent

UNITED STATES PATENTS

| | | |
|---|---|---|
| 1,644,951 | Rodhe | Oct. 11, 1927 |
| 1,698,722 | Henderson | Jan. 15, 1929 |
| 1,709,042 | Siebert | Apr. 16, 1929 |
| 1,874,801 | Porter | Aug. 30, 1932 |
| 1,931,442 | Klempt | Oct. 17, 1933 |
| 2,036,251 | Boynton | Apr. 7, 1936 |
| 2,135,695 | Bardwell | Nov. 8, 1938 |
| 2,166,611 | Schapleigh | July 18, 1939 |
| 2,298,288 | Gerrish et al. | Oct. 13, 1942 |
| 2,353,538 | Barber | July 11, 1944 |

OTHER REFERENCES

"Comprehensive Treatise on Inorganic and Theoretical Chemistry," Longmans, Green and Co., N.Y., 1928, vol. 8, page 97 (Mellor).

Lunge: "Technical Gas Analysis," D. Van Nostrand Co., N.Y., 1914, page 128.

Eckman: "Industrial Instrumentation," John Wiley and Sons, N.Y., 1950, page 184.

"Chemical and Metallurgical Engineering," May 1943, Report on Measurement and Control of Process Variables, pages 97–145.